United States Patent
Yilmaz et al.

(10) Patent No.: US 9,781,606 B2
(45) Date of Patent: Oct. 3, 2017

(54) SPECTRUM SHARING FOR SMALL CELLS IN MULTI-OPERATOR NETWORKS

(71) Applicant: Nokia Technologies Oy, Espoo (FI)

(72) Inventors: Osman Yilmaz, Espoo (FI); Mikko Uusitalo, Helsinki (FI); Zexian Li, Espoo (FI); Martti Moisio, Klaukkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/034,501

(22) PCT Filed: Nov. 13, 2013

(86) PCT No.: PCT/IB2013/060111
§ 371 (c)(1),
(2) Date: May 4, 2016

(87) PCT Pub. No.: WO2015/071704
PCT Pub. Date: May 21, 2015

(65) Prior Publication Data
US 2016/0277937 A1    Sep. 22, 2016

(51) Int. Cl.
*H04W 4/00* (2009.01)
*H04W 16/14* (2009.01)
(Continued)

(52) U.S. Cl.
CPC ....... *H04W 16/14* (2013.01); *H04W 56/0015* (2013.01); *H04W 72/0446* (2013.01); *H04W 84/045* (2013.01)

(58) Field of Classification Search
CPC ............. H04W 16/14; H04W 56/0015; H04W 84/045
(Continued)

(56) References Cited

U.S. PATENT DOCUMENTS

| 2008/0219213 | A1 | 9/2008 | Natarajan et al. | |
|---|---|---|---|---|
| 2011/0188481 | A1* | 8/2011 | Damnjanovic | H04W 72/04 370/336 |

(Continued)

OTHER PUBLICATIONS

"Electromagnetic Compatibility and Radio Spectrum Matters (ERM); System Reference Document (SRdoc);Mobile Broadband Services in the 2 300 MHz-2 400 MHz Frequency Band Under Licensed Shared Access Regime", ETSI TR 103 113, V1.1.1, Jul. 2013, pp. 1-37.

(Continued)

*Primary Examiner* — Nghi H Ly
(74) *Attorney, Agent, or Firm* — Squire Patton Boggs (US) LLP

(57) ABSTRACT

The exemplary embodiments include at least a method and apparatus sending by a second network operator a request to use sub-frames muted by macro cells of a first network operator for use by at least one small cell of the second network operator; receiving information for the use of the muted sub-frames; synchronizing a use of the muted sub-frames; and sending an indication of the synchronized use. In addition, a method and apparatus receiving by a first network operator a request to use sub-frames muted by macro cells of the first network operator for use by at least one small cell of a second network operator; sending information for the use of the muted sub-frames; and receiving an indication of the synchronized use of the muted sub-frames.

18 Claims, 7 Drawing Sheets

(51) Int. Cl.
*H04W 56/00* (2009.01)
*H04W 72/04* (2009.01)
*H04W 84/04* (2009.01)

(58) Field of Classification Search
USPC .............................. 455/454, 450, 444, 422.1
See application file for complete search history.

(56) References Cited

U.S. PATENT DOCUMENTS

2012/0170545 A1* 7/2012 Yamamoto .......... H04W 56/002
370/330
2015/0036519 A1* 2/2015 Kazmi ...................... H04L 5/00
370/252

OTHER PUBLICATIONS

International Search Report and Written Opinion received for corresponding Patent Cooperation Treaty Application No. PCT/IB2013/060111, dated Jul. 15, 2014, 13 pages.
"Almost Blank Subframe Request From Pico to Macro eNB", 3GPP TSG RAN WG3 #70 Meeting, R3-103336, Agenda item: 19.1, Alcatel-Lucent Shanghai Bell, Nov. 15-19, 2010, 2 pages.
Pedersen et al., "Eicic Functionality and Performance for LTE HetNet Co-Channel Deployments", IEEE Vehicular Technology Conference (VTC Fall), 2012, pp. 1-5.
"Enhanced Mechanisms for Network Listening", 3GPP TSG RAN WG1 Meeting #75, R1-135038, Agenda Item: 6.2.6.3, Huawei, Nov. 11-15, 2013, 5 pages.

* cited by examiner

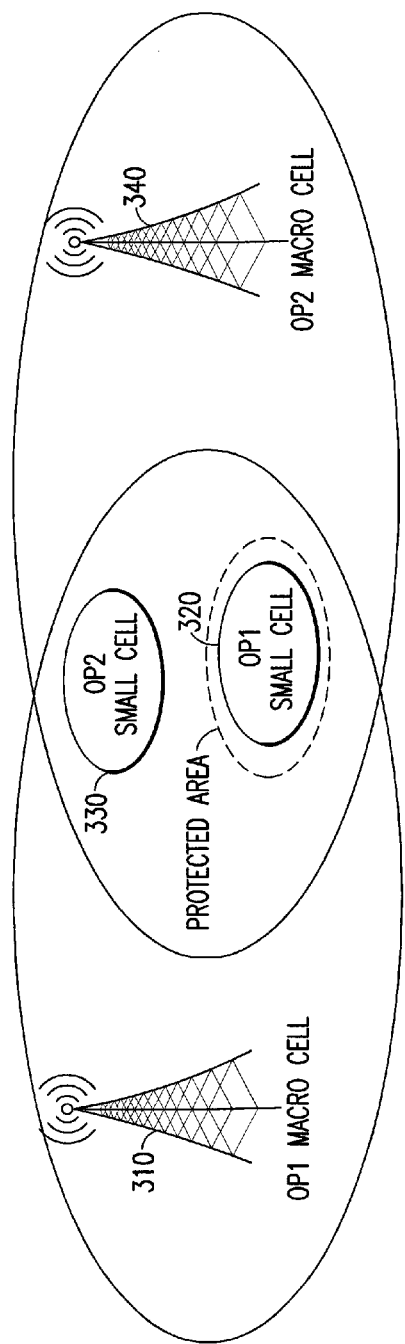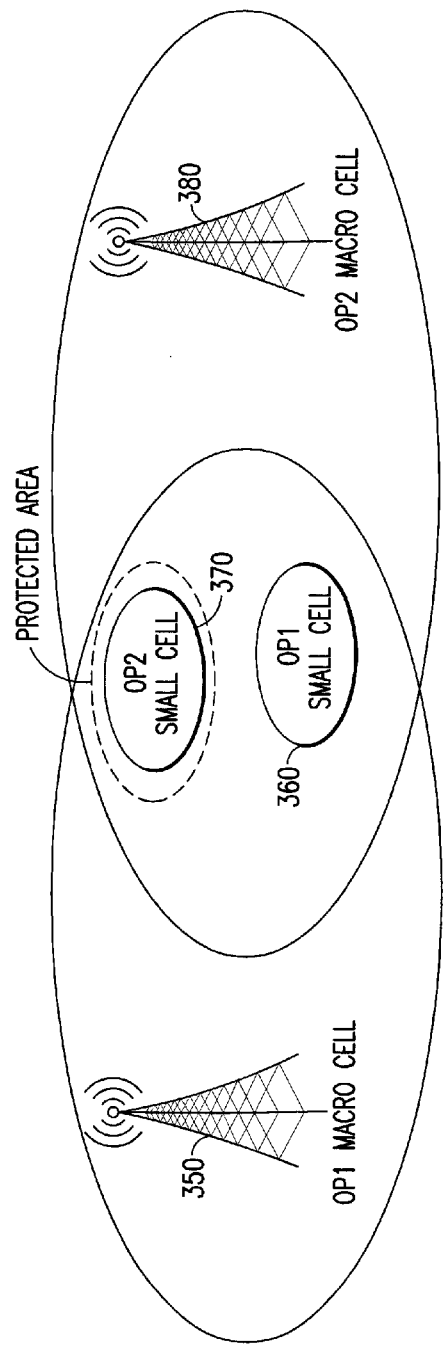

SPECTRUM SHARING FOR SMALL CELLS IN MULTI-OPERATOR NETWORKS

RELATED APPLICATION

This application was originally filed as PCT Application No. PCT/IB2013/060111 filed Nov. 13, 2013.

TECHNICAL FIELD

The teachings in accordance with the exemplary embodiments of this invention relate generally to license band spectrum sharing and, more specifically, relate to detailed signaling design for inter-operator spectrum handshaking for licensed band spectrum sharing, synchronization and related configuration.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
BS base station
CRE cell range expansion
eICIC enhanced inter-cell interference coordination
feICIC further enhanced inter-cell interference coordination
eNB evolved node b
HetNet heterogeneous networks
ICIC inter-cell interference coordination
QoS quality of service
RSSI received signal strength indicator
TDM time division multiplexing
UE user equipment
LSA licensed shared access
OP operator Third Generation Partnership Project (3GPP) Long Term Evolution (LTE) and Long term Evolution advanced (LTE-A) programs are intended to develop and standardize technology in order to provide improved spectral efficiency, reduced latency, and more efficient use of radio resources for improved user experiences and faster data transmission.

In coming years, it is expected that a large number of small cells will be operated under a macro layer (HetNet scenario). Still, increasing cell densification alone may not be sufficient to meet the requirements of continuously increased data demand. Hence, methods, systems, and apparatus for dynamically monitoring and/or allocating spectrums are useful.

SUMMARY

In accordance with an exemplary aspect of the invention there is a method, comprising: sending by a second network operator a request to use sub-frames muted by macro cells of a first network operator for use by at least one small cell of the second network operator; in response to the request, receiving information for the use of the muted sub-frames from the first network operator; synchronizing a use of the muted sub-frames; and sending an indication of the synchronized use to the first network operator.

In accordance with an exemplary aspect of the invention there is an apparatus comprising: at least one processor; and at least one memory including computer program code, where the at least one memory and the computer program code are configured, with the at least one processor, to cause the apparatus to at least: send by a second network operator a request to use sub-frames muted by macro cells of a first network operator for use by at least one small cell of the second network operator; in response to the request, receive information for the use of the muted sub-frames from the first network operator; synchronize a use of the muted sub-frames; and send an indication of the synchronized use to the first network operator.

In accordance with an exemplary aspect of the invention there is an apparatus comprising: means for sending by a second network operator a request to use sub-frames muted by macro cells of a first network operator for use by at least one small cell of the second network operator; means, in response to the request, for receiving information for the use of the muted sub-frames from the first network operator; means for synchronizing a use of the muted sub-frames; and means for sending an indication of the synchronized use to the first network operator.

In accordance with an exemplary aspect of the invention as described above the means for sending and receiving comprises an interface to a communication network, and the means for synchronizing comprises a non-transitory memory including computer program code executed by at least one processor.

In accordance with an exemplary aspect of the invention there is a method, comprising: receiving by a first network operator a request to use sub-frames muted by macro cells of the first network operator for use by at least one small cell of a second network operator; in response to the request, sending information for the use of the muted sub-frames; and receiving from the second operator an indication of the synchronized use of the muted sub-frames.

In accordance with an exemplary another aspect of the invention there is an apparatus comprising: at least one processor; and at least one memory including computer program code, where the at least one memory and the computer program code are configured, with the at least one processor, to cause the apparatus to at least: receive with a first network operator a request to use sub-frames muted by macro cells of the first network operator for use by at least one small cell of a second network operator; in response to the request, send information for the use of the muted sub-frames; and receive from the second operator an indication of the synchronized use of the muted sub-frames.

In accordance with an exemplary still another aspect of the invention there is apparatus comprising: means for receiving by a first network operator a request to use sub-frames muted by macro cells of the first network operator for use by at least one small cell of a second network operator; means, in response to the request, for sending information for the use of the muted sub-frames; and means for receiving from the second operator an indication of the synchronized use of the muted sub-frames.

In accordance with the exemplary aspects of the invention as described above the means for receiving and sending comprises an interface to a communication network, and a non-transitory memory including computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein:

FIGS. 3A and 3B each illustrated cell coverage scenarios for muted sub-frame operations in accordance with the exemplary embodiments of the invention;

DETAILED DESCRIPTION

Figure 1:
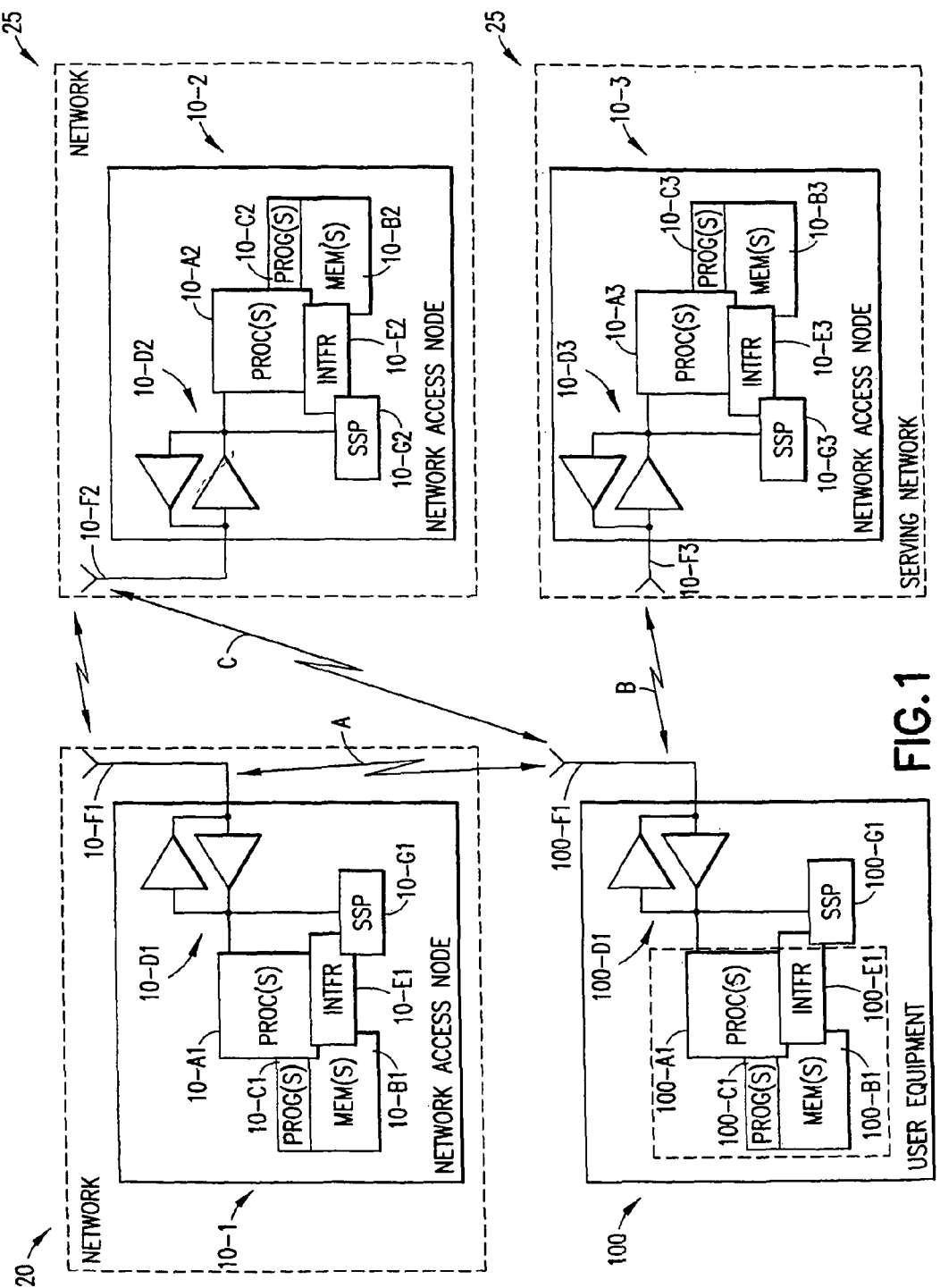
FIG. 1 is a simplified block diagram of various devices suitable for use in practicing the exemplary embodiments of the invention.

In this invention, we propose detailed signaling for inter-operator spectrum handshaking for licensed band spectrum sharing, synchronization and related configuration.

European Commission and an advisory committee of the president of the United States (PCAST) have both highlighted the need to find new ways for spectrum sharing. For instance, Licensed Shared Access (LSA) is one of the latest spectrum sharing enablers. In coming years, it is expected that large numbers of small cells will be operated under a macro layer HetNet scenario. On the other hand, increasing cell densification alone is not sufficient to meet the requirements of continuously increased data demand. Therefore, the spectrum should be utilized more efficiently with novel/ improved technical enablers e.g., licensed shared access (LSA). This is also recognized in METIS 5G European Union project where spectrum sharing concepts are seen as one key element in reaching the very ambitious 5G capacity needs.

Inter-cell enhanced interference coordination (ICIC) schemes evolve adopting enhanced ICIC (eICIC) and further eICIC (feICIC) schemes designed for HetNet (macro-small cell) interference coordination. In LTE, TDM enhanced inter-cell interference coordination (eICIC) has been enabled by the standards and UE impact is through the measurement restrictions configured by the network. In addition, LSA has been under standardization efforts in ETSI RRS for over a year. Recently ETSI finalized TR 103 113, a technical report on Mobile broadband services in the 2300-2400 MHz frequency band under LSA, with content on use cases and high level architecture. The eICIC schemes include an optional method to decrease interference between neighboring macro base stations by lowering the power of a part of the sub-channels in the frequency domain which then can only be received close to the base station. These sub-channels do not interfere with the same sub-channels used in neighboring cells and thus, data can be sent faster on those sub-channels to mobile devices close to the cell.

In accordance with an exemplary embodiment of the invention the specified eICIC schemes, macro layer resources such as sub-frames of a first operator can be partially muted in the time domain (i.e., TDM eICIC) in order to mitigate the inter-cell interference from macro layer to small cell layer and to extend the small cell coverage of the first operator. In accordance with the exemplary embodiments, the spectrum efficiency can be further improved with the muted sub-frames. Then not only the small cells of the first operator but also the small cells of a second operator are able to use the muted resources, since the small cells are mainly deployed for the capacity extension and they are not necessarily overlapping/interfering with each other. However, for the specified eICIC schemes as mentioned above inter-operator usage are not feasible as it is without inter-operator spectrum handshaking for licensed band spectrum sharing, synchronization and related configuration. The exemplary embodiments of the invention address at least this shortfall.

The embodiments of the invention may be utilized with LSA for improved spectrum sharing. However, this is non-limiting and the embodiments of the invention can be applied using various spectrum sharing options, and not only LSA.

LSA enables authorizing access to an available spectrum, in addition to a licensed/unlicensed or exclusive use. LSA is based on an underutilization of a spectrum in time, geography, and/or frequency. LSA spectrum rights may be provided to LSA licensees subject to terms defined by a holder or regulator of a spectrum. Sharing under the LSA framework is binary by nature and it admits spectrum use by either the incumbent or the LSA licensee. Incumbents can be defined as being holders of a spectrum right of use. An LSA licensee may be afforded dedicated spectrum rights of use where and when the spectrum is not used by the incumbent. LSA rights can be granted on a short or long term basis.

Spectrum sharing use cases under LSA generally fall within categories such as supplemental shared use, exclusive or long-term shared use, and dynamic shared use. Supplemental shared LSA could be used to make a portion of a spectrum at least partly available to wireless services until any reconfiguration is completed provided that incumbents are willing to engage. Exclusive or long-term LSA shared use is most efficient in cases where sharing is more difficult to implement such that auctioning for the repurposing would not be economically justified. This exclusivity enables a better means for QoS to be implemented. In addition LSA may be configured for exclusive shared use on a basis of time, location, and frequency with a current holder of spectrum rights of use. Dynamic LSA shared use relates to real-time LSA by multiple entities. With dynamic LSA, capabilities may be used to full extent in a dynamic manner with increased optimization. However, with this type of LSA QoS may not be as predictable.

In accordance with an exemplary embodiment of the invention if a macro cell of an operator, referred to herein as OP1 for example, is muted to mitigate interference to small cells of OP1, then small cells of a macro cell of another operator, referred herein referred to as OP2 for example, can also be authorized to use the muted resources of the OP1 macro cell provided that the OP2 small cells are not inside the protected zone of the OP1 small cells but inside OP1 macro cell. In this regard the protected zone may refer to the area limited by the certain distance (from OP1 small cells); or proximity measure, detection or indication; or the certain received signal strength (e.g., RSSI) or quality (of OP1 small cells).

Before discussing the invention in detail reference will be made to FIG. 1. FIG. 1 illustrates an overview of one environment where the exemplary embodiments of the invention interference suppression may be practiced. FIG. 1 is a block diagram having a number of network access nodes 10 communicating in a network 20. The network 20 can include wireless/wired networks and more than one cell. In accordance with the exemplary embodiments of the invention, communications between devices, such as the devices in FIG. 1, can include direct communication, communication via another device that is of the network or outside the network and/or via the Internet. In addition, any part or all of these communications may be offloaded to a 3rd party network or device. The network 20 includes network access nodes 10-1, 10-2, and 10-3, in wireless and/or wired communication. The network access node 10-1 includes one or more processors 10-A1, one or more memories 10-B1 containing one or more programs 10-C1, a radio frequency transceiver 10-D1 able to receive and transmit data, an interface 10-E1, and one or more antennas 10-F1. Similarly, the network access node 10-2 includes one or more processors 10-A2, one or more memories 10-B2 containing one or more programs 10-C2, a radio frequency transceiver 10-D2 able to receive and transmit data, an interface 10-E2, and one or more antennas 10-F2. In the example of FIG. 1, the network access node 10-3 includes one or more processors 10-A3, one or more memories 10-B3 containing one or more programs 10-C3, an interface 10-E3, and one or more antennas 10-F3. It is noted that any of the interfaces 10-E1, 10-E2, and 10-E3 can comprise at least one of or a combination of a wired and/or wireless interface. The wireless interface may be referred to as an air interface. In addition, any of these interfaces can be configured to provide a wired, wireless, and/or backhaul connection interface.

In addition, the network access nodes 10-1, 10-2, and 10-3 can each include a spectrum sharing processor (SSP) 10-G1, 10-G2 and 10-G3, respectively, to provide the spectrum sharing procedures and enable the novel operations in accordance with the exemplary embodiments of the invention. For instance, the network access nodes 10-1, 10-2, and 10-3 could each be a base station of a different operator which is/are transmitting and/or receiving information comprising the novel source signaling and/or re-selection or selection information. One or more of the network access nodes 10-1, 10-2, and 10-3 may be a primary operator network node, while at least one of a remainder of the network access nodes 10-1, 10-2, and 10-3 may be a secondary operator network node. At least the network access nodes 10-1, 10-2, and 10-3 can exchange and synchronize sub-frame muting information to enable spectrum sharing in accordance with the exemplary embodiments of the invention.

The User Equipment 100 as in FIG. 1 includes one or more processors 100-A1, one or more memories 100-B1 containing one or more programs 100-C1, a radio frequency transceiver 100-D1 able to receive and transmit data, an interface 100-E1, and one or more antennas 100-F1. The interface 100-E1 is configured to operate as a wireless interface, also referred to as an air interface for communication with the network. Further, the User Equipment 100 also includes a spectrum sharing processor (SSP) 100-G1. In accordance with the exemplary embodiments of the invention, the SSP processor 100-G1 is configured to at least utilize the novel signaling information of the invention to allow the User Equipment 100 to perform spectrum sharing procedures in a source or other network layer using at least the spectrum usage information. The User Equipment 100 can be any mobile equipment such as a cellular phone or other cellular device, and the network access node 10-1 could be a serving access node network of a cell where the User Equipment 100 is located. Further, as illustrated there may be a wired and/or wireless connections established between any of the network access nodes 10-1, 10-2, and 10-3. Any of these connections may be used for communications of novel signaling and information in accordance with the exemplary embodiments of the invention.

As shown in FIG. 1, there exist several interconnections between the network parts shown by corresponding arrows or lines. These interconnections may be established by means of interfaces or reference points which may be different in dependence of the employed network technology and which are known to those skilled in the art. In accordance with the exemplary embodiments signaling including the re-selection or selection information can be sent from a network node such as the Network Access Node 10-1. As illustrated with the signal line A the spectrum sharing information can be signaled to the User Equipment 100. In addition, in accordance with the embodiments the spectrum sharing information can be part of the system code of the User Equipment 100. Thus, spectrum sharing information can be input to the User Equipment 100 anytime during and after manufacture of the User Equipment 100. Further, signaling from a network node such as the Network Access Node 10-1 can include a command to cause the User Equipment 100 to perform spectrum sharing, synchronization, and configurations in accordance with the invention.

Figure 2A:
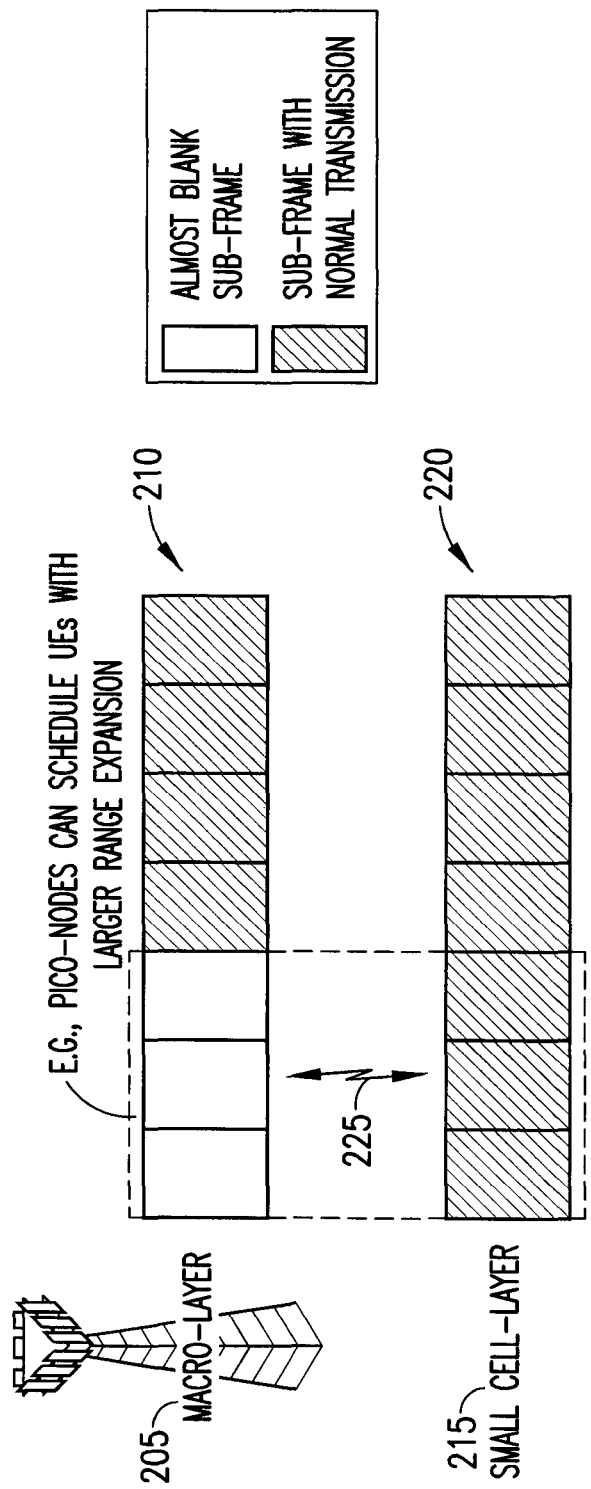
FIG. 2A is a block diagram illustrating a macro cell to small cell time division multiplexing allocation of muted sub-frames in accordance with the exemplary embodiments of the invention.

In accordance with the exemplary embodiments of the invention, the network access nodes 10-2, and 10-3 can transmit also signal re-selection or selection information over a dedicated channel. In addition, the re-selection or selection information may be broadcast. The network access node 10-1 can receive this re-selection or selection information and forward the information to the User Equipment 100 via its interface 10-E1. Similarly, in accordance with the exemplary embodiments, the User Equipment 100 can receive the re-selection or selection information via its interface 100-E over the one or more antennas 100-F1. The User Equipment 100 can use this information to identify a need to redirect to a network node, such as a source network layer node and to perform In regards to FIG. 2A there is illustrated a macro cell to small cell TDM eICIC in accordance with the embodiments. As shown in FIG. 2A a macro-layer cell of operator 205 is sharing 225 a portion of a spectrum 210 to supplement a spectrum 220 of a small cell-layer of operator 215. As illustrated in FIG. 2A almost blank sub-frames of the shared spectrum 210 may be used for normal transmission by the small cell. It is noted that for a pico cell spectrum, Pico-nodes may schedule user equipment (UE) with a larger range expansion layer. Cell range expansion (CRE) may be used to expand a pico cell range for example by including a bias value to a pico received power. In this case coverage and overall network throughput may be improved for at least the reason that the embodiments of the invention provide for more spectrum sharing capabilities without necessarily increasing a transmit power of a pico node.

Figure 2B:
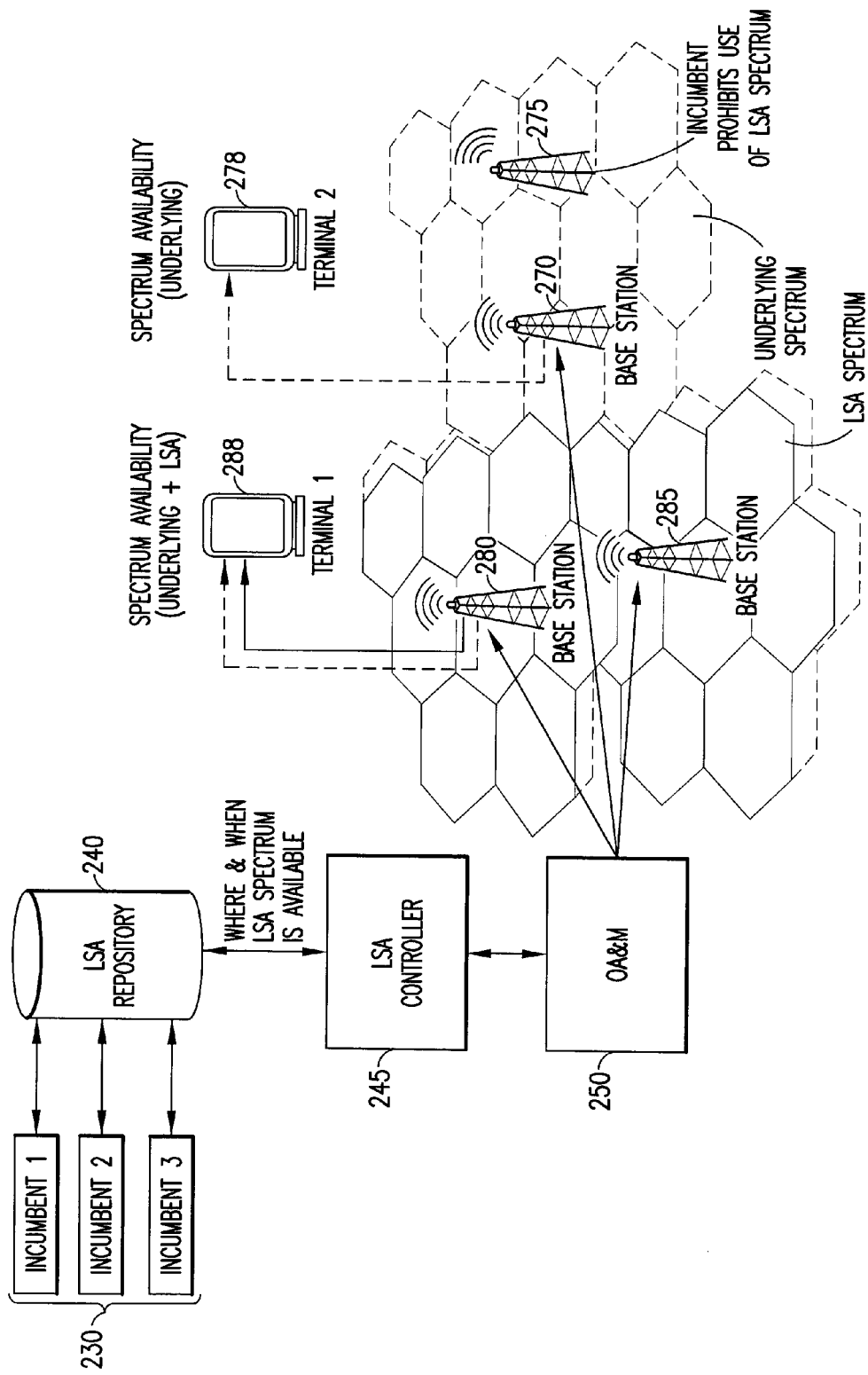
FIG. 2B illustrates an overview of a possible spectrum sharing scenario in accordance with the exemplary embodiments of the invention.

FIG. 2B illustrates a possible LSA architecture which can benefit using the exemplary embodiments of the invention. As illustrated in FIG. 2B an LSA Repository 240 has incumbent operators 1, 2, and 3. The Incumbents could offer an unused spectrum to one or several LSA licensees. The Incumbent would negotiate the LSA spectrum usage with the LSA licensee(s) according to the LSA spectrum award rules defined by the regulator. The incumbents are in communication with the LSA Repository 240. This repository contains the relevant information on spectrum where and when an LSA spectrum is available for use by LSA licensees (in the spatial, frequency and time domains). There could be one or more repositories per area. In addition, the LSA Repository 240 may be managed by or be delegated to a trusted third party. The LSA Repository 240 is in communication with the LSA Controller 245. The LSA Controller 245 is controlling access to a spectrum made available to an LSA licensee based on information of an incumbent's use and LSA availability provided by the LSA Repository 240. The LSA controller 245 may retrieve information about a spectrum made available under an LSA scheme from the LSA repository 240 and therefore obtain information on the available spectrum where its base stations are located. In this way base stations are allowed to transmit in an LSA band only when the LSA controller 245 indicates that the spectrum is available and no harmful interference is caused to the incumbent. Similar to the LSA Repository 240 there could be one or more LSA Controllers 245. Further, an LSA Controller 245 can interface with one or more LSA Repositories 240 and one or more LSA networks. In communication with the LSA controller 245 is the operations, administration, and management (OA&M) 250. The OA&M 250 may be incorporated on a server or in a network device such as the network access nodes 10-1, 10-2, and/or 10-3 which may or may not be within an LSA network. The OA&M 250 may be used to perform operations in accordance with the exemplary embodiments of the invention as will be described in more detail below. The OA&M 250 functionality may be used to implement a method in accordance with the exemplary embodiments the invention. In addition operations of any of these devices including the OA&M 250 may be implemented with at least the processors, programs, and memory of the network access nodes 10-1, 10-2, and/or 10-3 as illustrated in FIG. 1.

As illustrated in FIG. 2B the terminal 288 is communicating in underlying spectrum areas supported by base stations 280 and 285. In this case LSA access is implemented to be used with the underlying spectrum in these areas and the terminal 280 is granted use of the underlying spectrum and LSA. Whereas, in the underlying spectrum area supported by base station 270 LSA is not enabled, as it has been prohibited based on signaling from the base station 275. As such the terminal 278 may only use the underlying spectrum of the area. The management of access to LSA spectrum is completely transparent to the terminals 288 and 278 which at least one may be roaming between spectrum bands according to messages it receives from the network. It is noted that functionality of the terminals 288 and 278 may be implemented with at least the processor, program, and memory of the user equipment 100 as illustrated in FIG. 1.

As similarly stated above the embodiments of the invention may be similarly stated above to improve on existing ICIC schemes macro layer resources of a first operator can be partially muted in the time domain in order to mitigate the inter-cell interference from macro layer to small cell layer and to extend the small cell coverage of the first operator. For the muted sub-frames, the spectrum efficiency can be further improved if not only the small cells of the first operator but also the small cells of a second operator could be able to use the muted resources, since the small cells are mainly deployed for the capacity extension and they are not necessarily overlapping/interfering with each other. The exemplary embodiments of the invention provide a detailed signaling design for at least a method and apparatus to perform inter-operator spectrum handshaking for licensed band spectrum sharing, synchronization and related configuration resulting in non-overlapping sub-frames and reduced interference.

In accordance with an exemplary embodiment of the invention to implement various spectrum sharing options there is exchanging of muted sub-frame timing between operators. Some steps are of this novel approach include:

A secondary operator (OP2) requesting a use of muted sub-frames from a primary operator;

A primary operator (OP1) sending muted sub-frame numbers and a clock time of a first sub-frame to the secondary operator based on the request from the second operator;

The secondary operator applying either semi-synchronization (which means guard interval is used by the second operator in order to avoid unintended interference) or full-synchronization (where the clock times of the operators are at least locally synched e.g., secondary operator aligns its sub-frame timing with the primary operator);

The secondary operator informing the primary operator about the use of muted sub-frames;

Additionally, the sub-frames can be arranged by the operators such that they are not overlapping OP1 and OP2 muted sub-frame re-allocation (based on muted sub-frame timing exchange). This could be applied to allocate muted sub-frames in a non-overlapping way; and OP1/OP2 small cells configured with OP2/OP1 bands and related timing configuration.

It is noted that use of the term primary operator or secondary operator as used herein is not limiting to the embodiments of the invention. In this regard a primary operator or secondary operator may be referred to using for example the terms first operator or second operator, respectively.

Further, in accordance with an exemplary embodiment of the invention, timing is aligned with a primary network operator and then non-overlapping muted sub-frames are utilized by a secondary network operator. In this option, two operators have timing alignments then can fully utilize the muted sub-frames. In addition, in accordance with the exemplary embodiments there may be still overlapping muted sub-frames due to a number of muted sub-frames depending on the small cell traffic under each macro cell. Further, on each macro cell there could be different number of muted sub-frames. In accordance with the exemplary embodiments non-overlapping muted sub-frames can be utilized directly for the sharing. In this option, since two operators may not have timing alignment the sharing can include at least one of overlapping muted sub-frames and/or non-overlapping muted sub-frames can be used. In accordance with still another aspect of the invention muted sub-frames may be utilized as much as possible without a full synchronization by only using a guard interval.

In accordance with an exemplary embodiment of the invention if a macro cell of an operator, referred to herein as OP1 for example, is muted to mitigate interference to small cells of OP1, then small cells of a macro cell of another operator, referred herein referred to as OP2 for example, can also be authorized to use the muted resources of the OP1 macro cell provided that the OP2 small cells are not inside the protected zone of the OP1 small cells but inside OP1 macro cell. In this regard the protected zone may refer to the area limited by the certain distance (from OP1 small cells); or a proximity measure or detection or indication, or the certain received signal strength (e.g., RSSI) or quality (of OP1 small cells). To detect whether a small cell of an operator is inside the protected zone of another operator, UE measurements and indications and/or small cell location or mobility information or relevant key performance indicators may be used by a base station or OA&M. In accordance with the exemplary embodiments the base station may be a stationary and/or mobile base station.

FIGS. 3A and 3B related to licensed shared access in macro/small cell scenarios, such as eICIC scenarios. FIG. 3A illustrates a scenario where an OP1 macro cell 310 is muted, and LSA is granted for OP2 small cell 330. In FIG. 3A the OP2 small cell 330 is not inside a protected zone of OP1 small cell 320, thus LSA is available for the OP2 small cell 330. The protected zone may refer to the area limited by the certain distance (from OP1 small cells); or proximity measure, detection or indication; or certain received signal strength indications (e.g., RSSI) and/or a quality of OP1 small cells for example.

In regards to FIG. 3B there is illustrated a scenario where an OP2 macro cell 380 is muted and LSA is granted for OP1 small cell 360. In FIG. 3B the OP1 small cell 360 is not inside a protected zone of OP2 small cell 360, thus LSA is available for the OP1 small cell 360. The protected zone may refer to the area limited by the certain distance (from OP2 small cells); or proximity measure, detection or indication; or certain received signal strength indications (e.g., RSSI) and/or a quality of OP2 small cells for example.

In accordance with the exemplary embodiments a network device such as the OA&M 250 as discussed above may operate to perform operations in accordance with the exemplary embodiments of the invention in order to identify whether to allow utilization and/or utilize various spectrum sharing options. In addition, as indicated above the operations of the OA&M 250 may be implemented with at least the processors, programs, and memory of the network access nodes 10-1, 10-2, and/or 10-3 as illustrated in FIG. 1.

Figure 4:
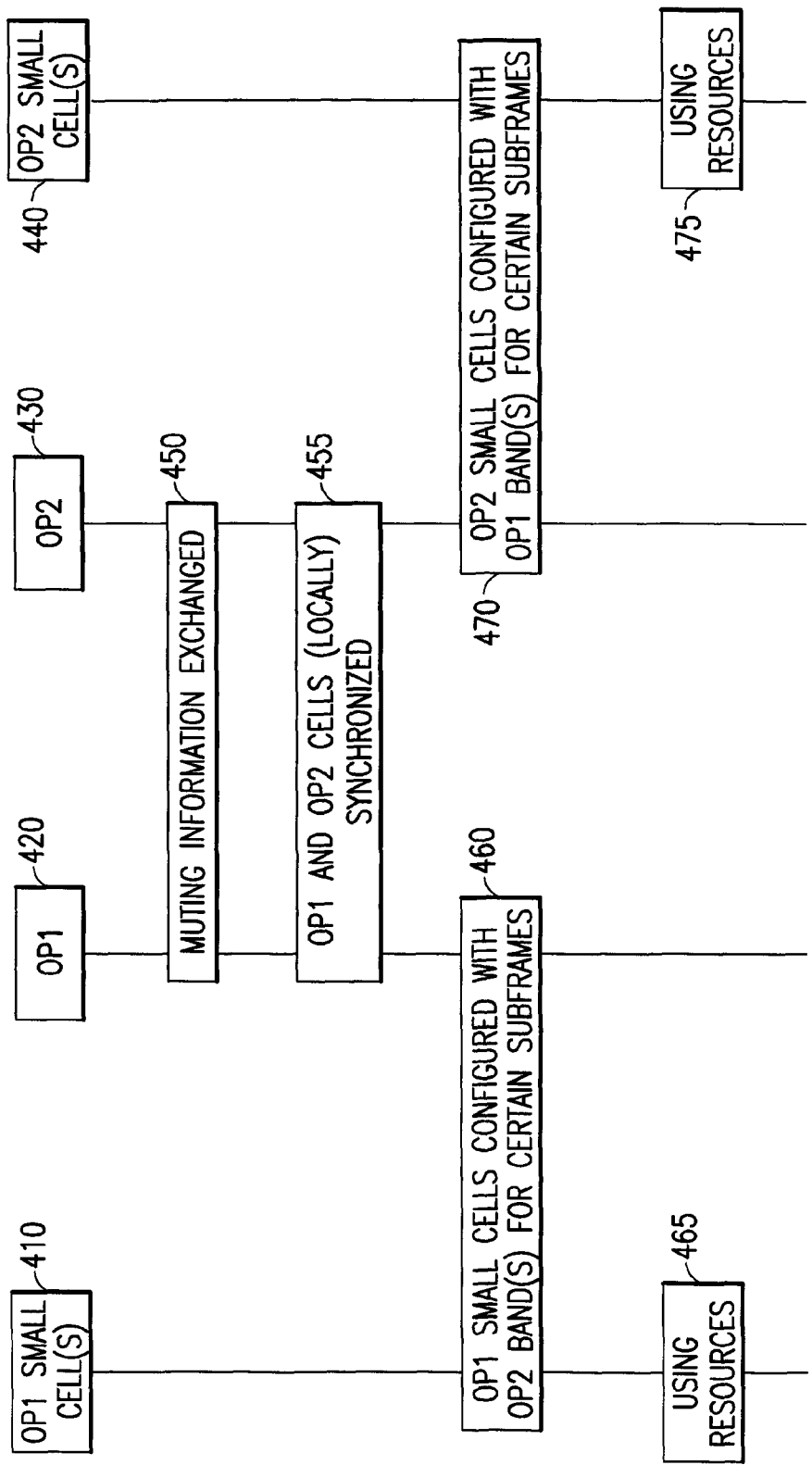
FIG. 4 illustrates signaling in accordance with an exemplary embodiments of the invention.
Figure 5:
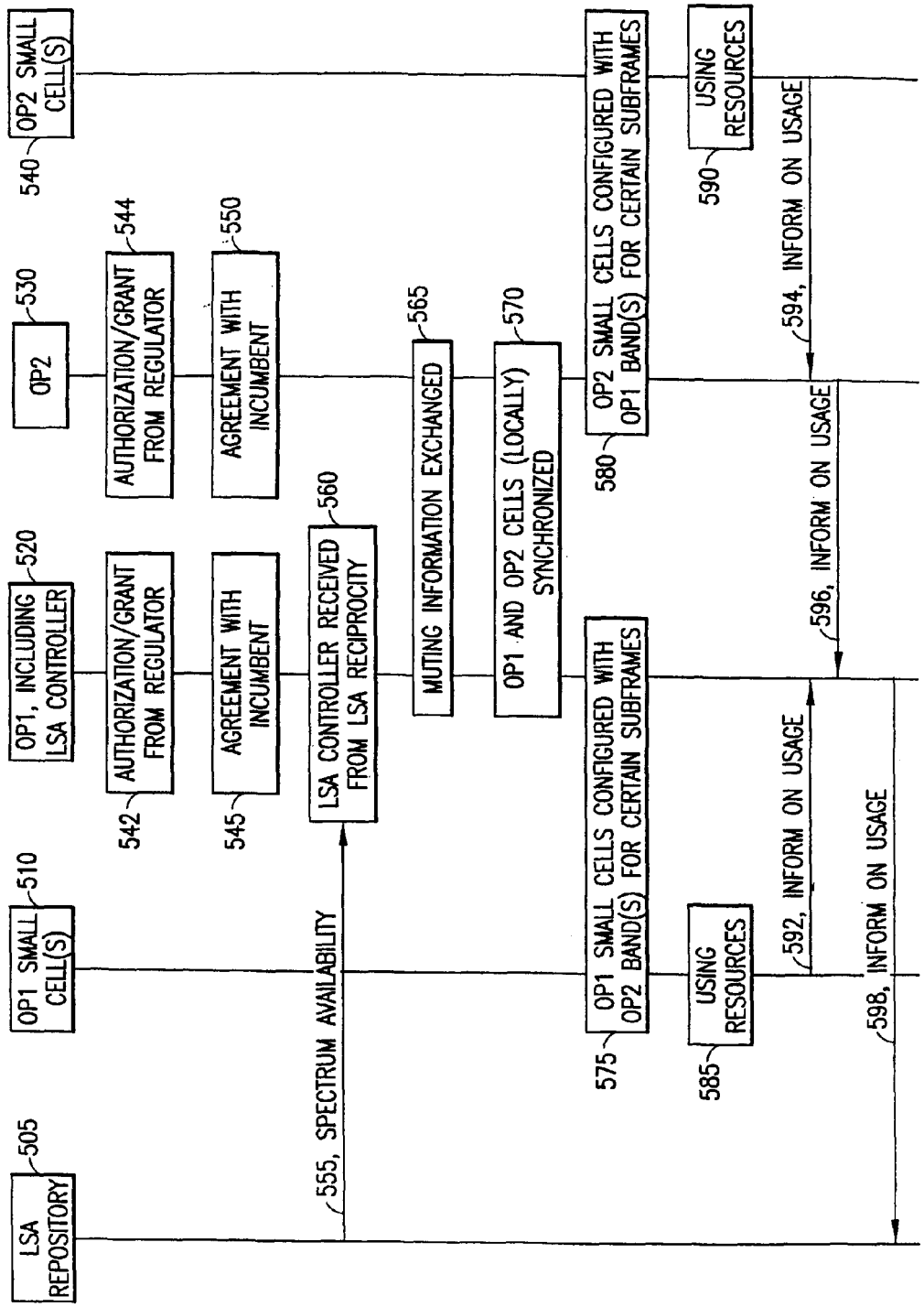
FIG. 5 illustrates signaling in accordance with another exemplary embodiments of the invention.

FIGS. 4 and 5 are each illustrated signaling flows in accordance with the exemplary embodiments of the invention.

FIG. 4 illustrates an exemplary signaling flow for the spectrum sharing where the operators (OP1 420 and OP2 430) share a spectrum. In FIG. 4 an OP1 cell or base station 420 and an OP2 cell or base station 430 exchange sub-frame muting information 450. Following this the OP1 and OP2 cells are locally synchronized, such as by the OA&M 250. Then as shown in FIG. 4 the operations with the OP1 small cell(s) 410 are configured with OP2 band(s) for certain sub-frames. Similarly in FIG. 4 the operations with the OP2 small cell(s) 440 are configured with OP1 band(s) for certain sub-frames.

In FIG. 4, the synchronization of the operators may not necessarily correspond to the full-synchronization of operators but also semi-synchronization can be applied by having guard periods which means not all the muted sub-frames can be used by the small cells of OP2 430. Here, the example assumes that operators can negotiate and handshake for spectrum sharing via a direct inter-operator interface. In addition to full- or semi-synchronization, time alignment can be arranged indirectly e.g., only the sub-frames that are fully non-overlapping are used by the secondary operator.

In accordance with the exemplary embodiments if muted OP1 420 resources are used under authorization via LSA for example, OP2 430 needs a granted authorization from a regulator and a commercial sharing agreement from incumbent or OP1. So OP1 420 could also be an intermediary between an incumbent and OP2 430. Alternatively OP1 420 and OP2 430 could have a mutual agreement for such spectrum sharing, being represented towards the incumbent together or via one of them. Same applies for information exchange between the LSA controllers of OP1 420 and OP2 430 and an LSA repository, as here OP1 and OP2 could be represented by one of them or be both in direct contact with the LSA repository.

FIG. 5 shows another example, in accordance with the exemplary embodiments of the invention, for a case where muted resources of an OP1 520 is being authorized via LSA. Here we assume that beforehand both OP1 520 and OP2 530 have been granted LSA rights from a regulator and that they have an agreement with the incumbent on using the LSA spectrum. Also there has been communication between LSA repository 505 and LSA controller of OP1 520 of information regarding the available LSA spectrum. The only addition then needed in comparison to FIG. 4 is that after spectrum usage, OP2 530 would inform OP1 520 on used LSA spectrum. In its report to LSA repository 505, the LSA controller of OP1 520 would then include spectrum usage information of both OP1 520 and OP2 530. So a difference to a non-LSA case is that the spectrum to be shared is not owned by OP1, but authorized via LSA. In our view it would be efficient and clear that there is one interface towards LSA repository, the one in main control of the spectrum as authorized to be used by the macro and OP1.

As illustrated in FIG. 5 as shown in block 542 and 544, respectively, OP1 520 and OP2 530 have been granted LSA rights from a regulator. As shown in blocks 545 and 550, respectively, OP1 520 and OP2 530 have agreements with an incumbent to use the LSA spectrum. There is communication of information 555 regarding the available LSA spectrum between the LSA repository 505 and the LSA controller of the OP1 520 at block 560. Then as shown in block 565 sub-frame muting information is exchanged. Such muting being used to mitigate interference and/or to enable usage of the muted sub-frames as described herein in accordance with the exemplary embodiments. At this time OP1 520 and OP2 530 can synchronize as shown with block 570 of FIG. 5. As similarly stated above this synchronization can be either semi-synchronization (which means guard interval is used by OP1 520 and/or OP2 530 in order to avoid unintended interference) or full-synchronization (where the clock times of the operators OP1 520 and/or OP2 530 are at least locally synched e.g., secondary operator aligns its sub-frame timing with the primary operator). Then the OP1 small cell(s) 510 is configured with OP2 bands for certain sub-frames as in block 575, and the OP2 small cell(s) 540 is configured with OP1 bands for certain sub-frames as in block 580. As shown with block 585 the OP1 small cell(s) 510 begin using resources, and as shown with block 590 the OP2 small cell(s) begin using resources. Thereafter, the OP1 small cell(s) communicate with OP1 520 to inform it of its usage 592, and similarly the OP2 small cell(s) 540 informs the OP2 530 about its usage. The usage reported 594 to the OP2 530 is then communicated 596 to the OP1 520. The OP1 520 communicates, with the OP I LSA controller, an indication 598 of these usages to the LSA repository 505.

With regards to FIG. 5, in case of potential evacuation with LSA, an incumbent needs to inform both OP1 520 and OP2 530. If the evacuation would be targeted at area where OP1 macro is operating, but not the small cells, small cells would get more resources. In fact the small cells would get all the LSA resources for their usage. Notably this is due to macro and small cell being in different locations and a restriction from evacuation preventing a macro cell from using the LSA spectrum, but leaving it available for small cell(s).This new situation could be handled via a new synchronization between OP1 520 and OP2 530. It could even be that in case of an evacuation the only cell not affected would be the small cell(s) of the operator using the muted resources of the other operator's macro. In such a case the "visiting" small cell(s) would get access to all the LSA resources of the other operator, if the agreement between the operators allows that.

Figure 6A:
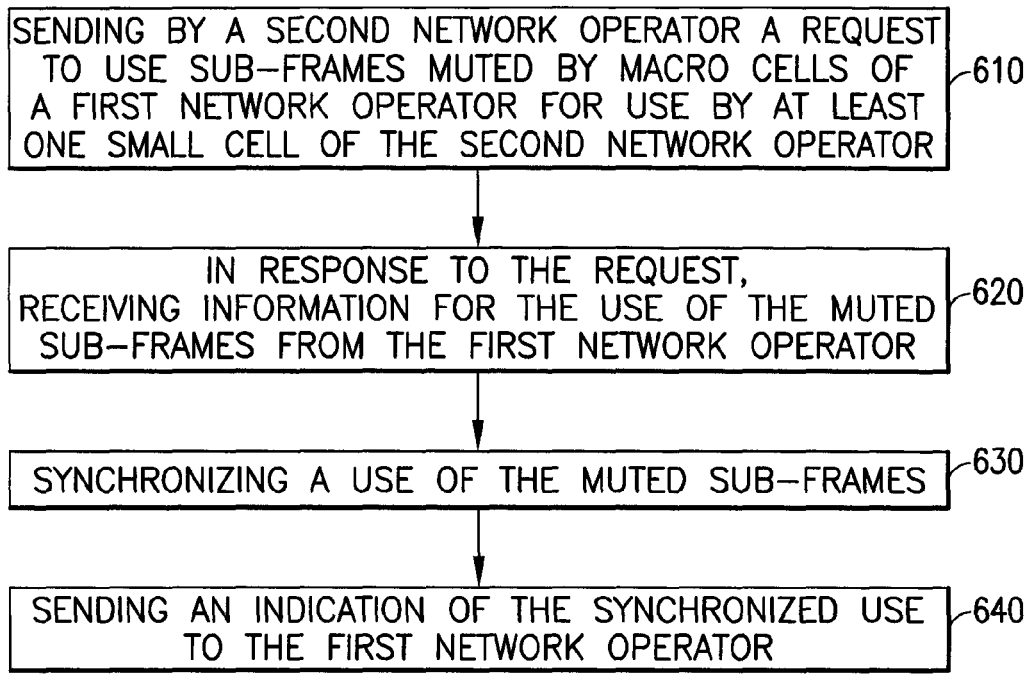
FIGS. 6A and 6B each illustrate logic flow block diagrams associated with a method and/or an operation by an apparatus in accordance with the exemplary embodiments of the invention.
Figure 6B:
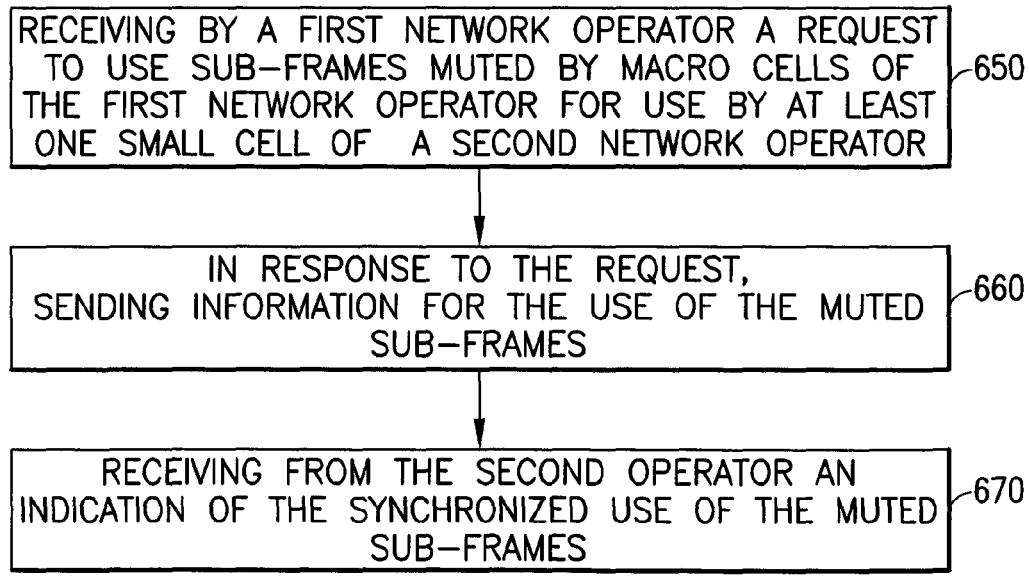

FIGS. 6A and 6B each illustrate logic flow block diagrams associated with a method and/or an operation by an apparatus in accordance with the exemplary embodiments of the invention.

As illustrated in block 610 of FIG. 6A there is sending by a second network operator a request to use sub-frames muted by macro cells of a first network operator for use by at least one small cell of the second network operator. In block 620 there is in response to the request, receiving information for the use of the muted sub-frames from the first network operator. As shown in block 630 there is synchronizing a use of the muted sub-frames. Then as shown in block 640 of FIG. 6A there is sending an indication of the synchronized use to the first network operator.

In accordance with the exemplary embodiments as described in the paragraph above, the synchronizing comprises at least one of: aligning timing with the first network operator for the use of the muted sub-frames such that the use is only of non-overlapping muted sub-frames of the first network operator; arranging a number of the muted sub-frames with the first network operator such that the muted sub-frames are non-overlapping; applying a guard interval to the muted sub-frames, wherein the aligning and the arranging is based at least in part on exchanging information on the use of the muted subframes received with the first operator.

In accordance with the exemplary embodiments as described in the paragraph above, the exchanging information comprises exchanging information of at least one of a clock time of a first muted sub-frame, and muted sub-frame numbers.

In accordance with the exemplary embodiments as described in the paragraphs above, the synchronizing is based on the received information, and the synchronization comprises at least one of: aligning timing with the first network operator for the use of the muted sub-frames then using non-overlapping muted sub-frames of the first network operator; directly utilizing non-overlapping muted sub-frames of the first network operator; and utilizing a guard interval before starting transmission of the muted sub-frames of the first operator.

In accordance with the exemplary embodiments as described in the paragraphs above, the at least one small cell comprises at least one of a stationary or mobile base station.

In accordance with the exemplary embodiments as described in the paragraphs above, the sub-frames are muted for use in at least one small cell of the first network operator.

In accordance with the exemplary embodiments as described in the paragraphs above, the first network operator is a primary network operator, and wherein the second network operator is a secondary network operator, or vice versa.

In accordance with the exemplary embodiments as described in the paragraph above, the use of the muted sub-frames is limited to small cells of the secondary network operator which are determined to be outside a protected zone of at least one small cell of the primary network operator.

In accordance with the exemplary embodiments as described in the paragraph above, the determining is based on at least one of a detected distance or proximity with the protected zone of the at least one small cell.

In accordance with the exemplary embodiments at least the operations as described in the paragraphs above can be performed with a non-transitory memory including computer program code executed by at least one processor.

In accordance with the exemplary embodiments of the invention there is an apparatus comprising: at least one processor; and at least one memory including computer program code, where the at least one memory and the computer program code are configured, with the at least one processor, to cause the apparatus to at least: send by a second network operator a request to use sub-frames muted by macro cells of a first network operator for use by at least one small cell of the second network operator; in response to the request, receive information for the use of the muted sub-frames from the first network operator; synchronize a use of the muted sub-frames; and send an indication of the synchronized use to the first network operator.

In accordance with the exemplary embodiments of the invention there is an apparatus comprising: means for sending by a second network operator a request to use sub-frames muted by macro cells of a first network operator for use by at least one small cell of the second network operator; means, in response to the request, for receiving information for the use of the muted sub-frames from the first network operator; means for synchronizing a use of the muted sub-frames; and means for sending an indication of the synchronized use to the first network operator.

In accordance with the exemplary embodiments as described in the paragraph above, the synchronizing comprises at least one of: aligning timing with the first network operator for the use of the muted sub-frames such that the use is only of non-overlapping muted sub-frames of the first network operator; arranging a number of the muted sub-frames by the first network operator such that the muted sub-frames are non-overlapping; applying a guard interval to the muted sub-frames, wherein the aligning and the arranging is based at least in part on exchanging information on the use of the muted subframes received from the first operator.

In accordance with the exemplary embodiments as described in the paragraph above, at least the means for sending and receiving comprises an interface to a communication network, and wherein at least the means for synchronizing comprises a non-transitory memory including computer program code executed by at least one processor.

In accordance with the exemplary embodiments of the invention there is an apparatus comprising means for performing all of the aspects of the invention as described herein. Where the means of the apparatus for performing the exemplary embodiments of the invention as described herein comprises at least one memory including computer program code, the computer program code executed by at least one processors.

In accordance with the exemplary embodiments of the invention there is an apparatus comprising means for performing all of the aspects of the invention as described herein. Where the means of the apparatus for performing the exemplary embodiments of the invention as described herein comprises at least one memory including computer program code, the computer program code executed by at least one processors.

As illustrated in block 650 of FIG. 6B there is receiving by a first network operator a request to use sub-frames muted by macro cells of the first network operator for use by at least one small cell of a second network operator. In block 660 there is, in response to the request, sending information for the use of the muted sub-frames. Then in block 670 of FIG.

6B there is receiving from the second operator an indication of the synchronized use of the muted sub-frames.

In accordance with the exemplary embodiments at least the operations as described in the paragraphs above the exchanging information comprises exchanging information of at least one of a clock time of a first muted sub-frame, and muted sub-frame numbers In accordance with the exemplary embodiments at least the operations as described in the paragraphs above the synchronizing is based on the sent information, and the synchronization comprises at least one of: a timing aligned with the first network operator for the use of the muted sub-frames then using non-overlapping muted sub-frames of the first network operator; a direct utilization of non-overlapping muted sub-frames of the first network operator; and a guard interval utilized for starting transmission of the muted sub-frames of the first operator.

In accordance with the exemplary embodiments at least the operations as described in the paragraphs above the at least one small cell comprises at least one of a stationary or mobile base station.

In accordance with the exemplary embodiments at least the operations as described in the paragraphs above the sub-frames are muted for use in at least one small cell of the first network operator.

In accordance with the exemplary embodiments as described in the paragraphs above, the first network operator is a primary network operator, and wherein the second network operator is a secondary network operator, or vice versa.

In accordance with the exemplary embodiments at least the operations as described in the paragraph above the use of the muted sub-frames is limited to small cells of the secondary network operator which are determined to be outside a protected zone of at least one small cell of the primary network operator.

In accordance with the exemplary embodiments at least the operations as described in the paragraph above the determining is based on at least one of a detected distance or proximity with the protected zone of the at least one small cell.

In accordance with the exemplary embodiments at least the operations as described in the paragraphs above can be performed with a non-transitory memory including computer program code executed by at least one processor.

In accordance with the exemplary embodiments of the invention there is an apparatus comprising: at least one processor; and at least one memory including computer program code, where the at least one memory and the computer program code are configured, with the at least one processor, to cause the apparatus to at least: receive with a first network operator a request to use sub-frames muted by macro cells of the first network operator for use by at least one small cell of a second network operator; in response to the request, send an indication of availability for the use of the muted sub-frames; and receive from the second operator an indication of the synchronized use of the muted sub-frames.

In accordance with the exemplary embodiments at least the operations as described in the paragraphs above the indication of the synchronized use comprises an indication of at least one of: timing alignment with the first network operator for the use of the muted sub-frames such that the use is only of non-overlapping muted sub-frames of the first network operator; a number arrangement of the muted sub-frames with the second network operator such that the muted sub-frames are non-overlapping; a guard interval applied to the muted sub-frames, wherein the aligning and the arranging is based at least in part on information on the use of the muted subframes exchanged with the second network operator.

In accordance with the exemplary embodiments of the invention there is an apparatus comprising: means for receiving by a first network operator a request to use sub-frames muted by macro cells of the first network operator for use by at least one small cell of a second network operator; means, in response to the request, for sending an indication of availability for the use of the muted sub-frames; and means for receiving from the second operator an indication of the synchronized use of the muted sub-frames.

In accordance with the exemplary embodiments at least the operations as described in the paragraph above the indication of the synchronized use comprises an indication of at least one of timing alignment with the first network operator for the use of the muted sub-frames such that the use is only of non-overlapping muted sub-frames of the first network operator; a number arrangement of the muted sub-frames by the second network operator such that the muted sub-frames are non-overlapping; a guard interval applied to the muted sub-frames, wherein the aligning and the arranging is based at least in part on information on the use of the muted subframes exchanged with the second network operator.

In accordance with the exemplary embodiments at least the operations as described in the paragraphs above the means for receiving and sending comprises an interface to a communication network, and a non-transitory memory including computer program code executed by at least one processor.

In accordance with the exemplary embodiments of the invention there is an apparatus comprising means for performing all of the aspects of the invention as described herein. Where the means of the apparatus for performing the exemplary embodiments of the invention as described herein comprises at least one memory including computer program code, the computer program code executed by at least one processors.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    sending by a second network operator a request to use sub-frames muted by macro cells of a first network operator for use by at least one small cell of the second network operator;
    in response to the request, receiving information for the use of the muted sub-frames from the first network operator, wherein the information includes a clock time of a first sub-frame and one or more muted sub-frame numbers;
    synchronizing a use of the muted sub-frames based on either semi-synchronization or full-synchronization;
    sending an indication of the synchronized use to the first network operator; and
    allocating the muted sub-frames, without overlapping, based upon one or more muted sub-frame timing exchanges.

2. The method of claim 1, wherein the synchronizing is based on the received information, and the synchronization comprises at least one of:
    aligning timing with the first network operator for the use of the muted sub-frames then using non-overlapping muted sub-frames of the first network operator;
    directly utilizing non-overlapping muted sub-frames of the first network operator; and
    utilizing a guard interval before starting transmission of the muted sub-frames of the first operator.

3. An apparatus comprising:
    at least one processor; and
    at least one memory including computer program code, where the at least one memory and the computer program code are configured, with the at least one processor, to cause the apparatus to at least:
    send by the apparatus of a second network operator a request to use sub-frames muted by macro cells of a first network operator for use by at least one small cell of the second network operator;
    in response to the request, receive information for the use of the muted sub-frames from the first network operator, wherein the information includes a clock time of a first sub-frame and one or more muted sub-frame numbers;
    synchronize a use of the muted sub-frames based on either semi-synchronization or full-synchronization;
    send an indication of the synchronized use to the first network operator: and
    allocate the muted sub-frames, without overlapping, based upon one or more muted sub-frame timing exchanges.

4. The apparatus of claim 3, wherein the synchronizing is based on the received information, and the synchronizing comprises at least one of:
    aligning timing with the first network operator for the use of the muted sub-frames then using non-overlapping muted sub-frames of the first network operator;
    directly utilizing non-overlapping muted sub-frames of the first network operator; and
    utilizing a guard interval before starting transmission of the muted sub-frames of the first operator.

5. The apparatus of claim 3, wherein the at least one small cell comprises at least one of a stationary or mobile base station.

6. The apparatus of claim 3, wherein the sub-frames are muted for use in at least one small cell of the first network operator.

7. The apparatus of claim 3, wherein the first network operator is a primary network operator, and wherein the second network operator using the apparatus is a secondary network operator, or vice versa.

8. The apparatus of claim 7, wherein the use of the muted sub-frames is limited to small cells of the secondary network operator which are determined to be outside a protected zone of at least one small cell of the primary network operator.

9. The apparatus of claim 8, wherein the determining is based on at least one of a detected distance or proximity with the protected zone of the at least one small cell.

10. A method, comprising:
    receiving by a first network operator a request to use sub-frames muted by macro cells of the first network operator for use by at least one small cell of a second network operator;
    in response to the request, sending information for the use of the muted sub-frames from the first network operator, wherein the information includes a clock time of a first sub-frame and one or more muted sub-frame numbers;
    receiving from the second operator an indication of synchronized use of the muted sub-frames, wherein the muted sub-frames are synchronized based on either semi-synchronization or full-synchronization: and
    allocating the muted sub-frames, without overlapping, based upon one or more muted sub-frame timing exchanges.

11. The method of claim 10, wherein the synchronizing is based on the sent information, and the synchronizing comprises at least one of:
    a timing aligned by the second operator with the first network operator for the use of the muted sub-frames then using non-overlapping muted sub-frames of the first network operator;
    a direct utilization of non-overlapping muted sub-frames of the first network operator by the second operator; and
    a guard interval utilized for starting transmission of the muted sub-frames of the first operator by the second operator.

12. An apparatus comprising:
   at least one processor; and
   at least one memory including computer program code, where the at least one memory and the computer program code are configured, with the at least one processor, to cause the apparatus to at least:
   receive by the apparatus of a first network operator a request to use sub-frames muted by macro cells of the first network operator for use by at least one small cell of a second network operator;
   in response to the request, send information for the use of the muted sub-frames from the apparatus of the first network operator, wherein the information includes a clock time of a first sub-frame and one or more muted sub-frame numbers;
   receive from the second operator an indication of synchronized use of the muted sub-frames, wherein the muted sub-frames are synchronized based on either semi-synchronization or full-synchronization; and
   allocate the muted sub-frames, without overlapping, based upon one or more muted sub-frame timing exchanges.

13. The apparatus of claim 12, wherein the synchronizing is based on the sent information, and the synchronization comprises at least one of:
   a timing aligned by the second operator with the first network operator for the use of the muted sub-frames then using non-overlapping muted sub-frames of the first network operator;
   a direct utilization of non-overlapping muted sub-frames of the first network operator by the second operator; and
   a guard interval utilized for starting transmission of the muted sub-frames of the first operator by the second operator.

14. The apparatus of claim 12, wherein the at least one small cell comprises at least one of a stationary or mobile base station.

15. The apparatus of claim 12, wherein the sub-frames are muted for use in at least one small cell of the first network operator.

16. The apparatus of claim 12, wherein the first network operator using the apparatus is a primary network operator, and wherein the second network operator using the apparatus is a secondary network operator, or vice versa.

17. The apparatus of claim 16, wherein the use of the muted sub-frames is limited to small cells of the secondary network operator which are determined to be outside a protected zone of at least one small cell of the primary network operator.

18. The apparatus of claim 17, wherein the determining is based on at least one of a detected distance or proximity with the protected zone of the at least one small cell.

* * * * *